United States Patent
Trim et al.

(10) Patent No.: US 11,769,240 B2
(45) Date of Patent: Sep. 26, 2023

(54) COLLABORATIVE COGNITIVE ANALYSIS OF DIGITAL MEDIA STREAMS

(71) Applicant: International Business Machines Corporation, Armonk, NY (US)

(72) Inventors: Craig M. Trim, Ventura, CA (US); Kimberly Greene Starks, Nashville, TN (US); Gandhi Sivakumar, Bentleigh (AU); Kushal Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 16/695,517

(22) Filed: Nov. 26, 2019

(65) Prior Publication Data

US 2021/0158504 A1    May 27, 2021

(51) Int. Cl.
*G06T 7/00*       (2017.01)
*G06Q 30/02*      (2023.01)
*G06N 3/08*       (2023.01)
*G06Q 30/0283*    (2023.01)

(52) U.S. Cl.
CPC ............ *G06T 7/0004* (2013.01); *G06N 3/08* (2013.01); *G06Q 30/0278* (2013.01); *G06Q 30/0283* (2013.01); *G06T 2207/10016* (2013.01); *G06T 2207/20081* (2013.01); *G06T 2207/30108* (2013.01)

(58) Field of Classification Search
CPC .......... G06Q 30/0278; G06Q 30/0276; G06Q 30/0283; G06Q 30/0282; G06T 7/0004; G06T 7/0002; G06T 7/0008; G06T 2207/10016; G06T 2207/20081; G06T 2207/20084

USPC ......... 382/141, 135–139, 112, 100, 156, 209
See application file for complete search history.

(56) References Cited

U.S. PATENT DOCUMENTS

| | | |
|---|---|---|
| 6,021,113 A | 2/2000 | Doshi et al. |
| 6,845,393 B1 | 1/2005 | Murphy et al. |
| 10,319,054 B2 | 6/2019 | Smith |
| 10,380,653 B1 | 8/2019 | Flint et al. |
| 2003/0144849 A1 | 7/2003 | Kakivaya et al. |

(Continued)

FOREIGN PATENT DOCUMENTS

EP    3200139 A1    8/2017

OTHER PUBLICATIONS

Google Cloud, "Vision AI", Google, Accessed Oct. 1, 2019, 22 pages, <https://cloud.google.com/vision/>.

(Continued)

*Primary Examiner* — Andrae S Allison
(74) *Attorney, Agent, or Firm* — Isaac J. Gooshaw; Willam H. Hartwell; Jared L. Montanaro

(57) ABSTRACT

A neural network system for generating a value estimation is provided. A computing device analyzes one or more digital media streams. A computing device identifies one or more parameters of the object in one or more digital media streams. A computing device collects information of an object in one or more digital media streams. A computing device generates a precited value estimation of the object via invocation of additional multi-level input collection in a distributed cognitive system. A computing device communicates a report associated with the predicted value estimation of the object to a user of a computing device.

14 Claims, 6 Drawing Sheets

(56) References Cited

U.S. PATENT DOCUMENTS

| | | | |
|---|---|---|---|
| 2015/0135238 A1* | 5/2015 | Wickenkamp | H04N 21/4122 |
| | | | 725/80 |
| 2015/0332355 A1 | 11/2015 | Kost et al. | |
| 2016/0103932 A1* | 4/2016 | Sathish | G06F 3/04847 |
| | | | 715/767 |
| 2018/0068329 A1 | 3/2018 | Ganti et al. | |
| 2018/0114334 A1* | 4/2018 | Desai | G06V 10/82 |
| 2019/0019261 A1* | 1/2019 | Lammert, Jr. | G06V 20/00 |
| 2019/0251604 A1 | 8/2019 | Agassi et al. | |
| 2019/0251645 A1* | 8/2019 | Winans | G06V 20/10 |

OTHER PUBLICATIONS

Liu et al., "Adaptive Distributed Service Discovery for Dependable Service Integration", 2010 13th IEEE International Symposium on Object/Component/Service-Oriented Real-Time Distributed Computing Workshops, © 2010 IEEE, pp. 166-175.

Mell et al., "The NIST Definition of Cloud Computing", NIST, U.S. Department of Commerce, Special Publication 800-145, Sep. 2011, 7 pages.

Rougier, P., "Algorithms and Artificial Intelligence: New Horizons for Cost Estimation and Modeling?", Kepler, Posted on Oct. 2, 2017, 9 pages, <https://www.kepler-consulting.com/en/artificial-intelligence-cost-estimation/>.

You et al., "Image Based Appraisal of Real Estate Properties", arXiv:1611.09180v2 [cs.CV], Jul. 27, 2017, 8 pages.

"Algorithms and Artificial Intelligence: New Horizons for Cost Estimation and Modeling", KEPLER Insight, Sep. 27, 2017, 12 pages.

* cited by examiner

COLLABORATIVE COGNITIVE ANALYSIS OF DIGITAL MEDIA STREAMS

BACKGROUND OF THE INVENTION

The present invention relates generally to the field of neural networks, and more particularly to image and video processing.

Cognitive models are established neural networks that enrich the automation of human needs based on time and provide dynamic responses and computation. Neural network are computing systems that learn from data to perform tasks. For enhanced collaborative system execution, multiple cognitive models are connected to create a distributed cognitive system, which enriches data collections and processing capabilities.

SUMMARY

Embodiments of the present invention provide a method, system, and program product for a neural network system for generating a value estimation.

A first embodiment encompasses a method for a neural network system for generating a value estimation. One or more processors analyze one or more digital media streams for one or more objects. The one or more processors identify one or more parameters of the one or more objects in the one or more digital media streams. The one or more processors collect information of an object from the one or more digital media streams. The one or more processors generate a predicted value estimation of the one or more objects via invocation of additional multi-level input collections in a distributed cognitive system. The one or more processors communicate a report associated with the predicted value estimation of the object to a user of a computing device.

A second embodiment encompasses a computer program product for a neural network system for generating a value estimation. The computer program product includes one or more computer-readable storage media and program instructions stored on the one or more computer-readable storage media. The program instructions include program instructions to analyze one or more digital media streams for one or more objects. The program instructions include program instructions to identify one or more parameters of the one or more objects in the one or more digital media streams. The program instructions include program instructions to collect information of an object from the one or more digital media streams. The program instructions include program instructions to generate a predicted value estimation of the one or more objects via invocation of additional multi-level input collections in a distributed cognitive system. The program instructions include program instructions to communicate a report associated with the predicted value estimation of the object to a user of a computing device.

A third embodiment encompasses a computer system for a neural network system for generating a value estimation. The computer system includes one or more computer processors, one or more computer readable storage medium, and program instructions stored on the computer readable storage medium for execution by at least one of the one or more processors. The computer program product includes one or more computer-readable storage media and program instructions stored on the one or more computer-readable storage media. The program instructions include program instructions to analyze one or more digital media streams for one or more objects. The program instructions include program instructions to identify one or more parameters of the one or more objects in the one or more digital media streams. The program instructions include program instructions to collect information of an object from the one or more digital media streams. The program instructions include program instructions to generate a predicted value estimation of the one or more objects via invocation of additional multi-level input collections in a distributed cognitive system. The program instructions include program instructions to communicate a report associated with the predicted value estimation of the object to a user of a computing device.

DETAILED DESCRIPTION

Figure 1:
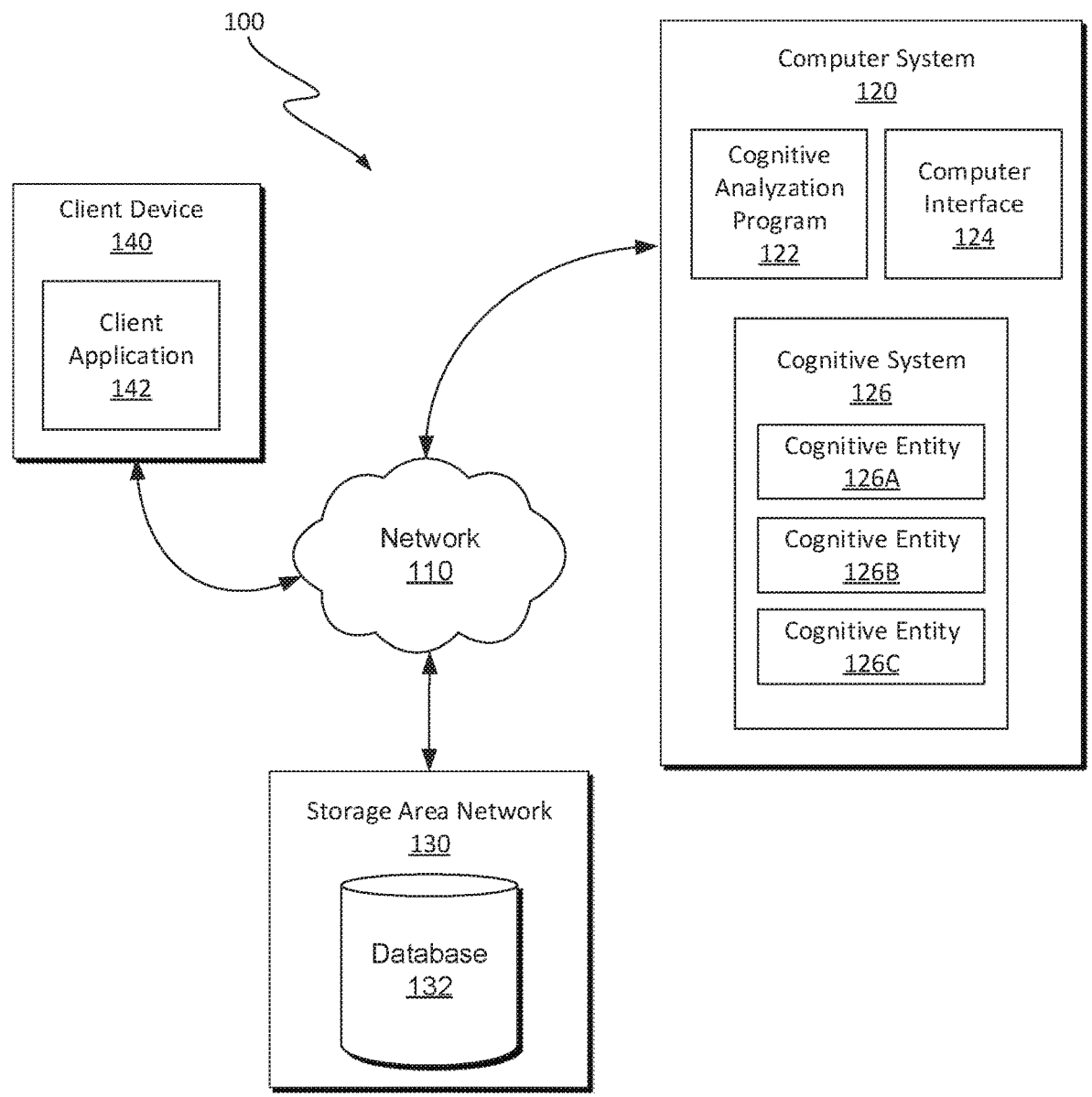
FIG. 1 is a functional block diagram illustrating a computing environment, in which a system for neural networks in value estimation, in accordance with an exemplary embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While possible solutions to cognitive models are known, these solutions may be inadequate to proactively analyze digital media through machine learning and generate an analysis based on complex objects contained within the digital media. For example, a given solution may fail to proactively analyze digital media by identifying small, innate objects or for authorization and security processing purposes. Generally, in machine learning, a weighted model may be preferable to have a high accuracy of prediction, or to have the ability to correctly predict a result of an unknown. Generally, machine learning analyzes various items and over time more accurately equates the various items with a label or description. Embodiments of the present invention provide a solution that may proactively analyze various items and provide a more accurate label or description, but additionally analyze supplementary objects associated with the various items not readily available in the digital media.

Embodiments of the present invention further provide a solution that utilizes a distributed cognitive system to predict the associated values of complex objects contained within digital media. The present invention recognizes that by applying a distributed cognitive system with dedicated cognitive entities for various attributes regarding the complex objects, the distributed cognitive system can more accurately identify the various attributes and more effectively identify and calculate the associated values with the complex objects.

In one embodiment, cognitive analyzation program 122 analyzes one or more digital media stream for one or more objects. Cognitive analyzation program 122 identifies one or more parameters of the one or more objects in one or more digital media streams. Cognitive analyzation program 122 collects information of the one or more objects from the one or more digital media streams. Cognitive analyzation program 122 generates a predicted value estimation of the one or more objects via invocation of additional multi-level input collection in a distributed cognitive system. Cognitive analyzation program 122 communicates a report associated with the predicted value estimation of the object to a user of a computing device In one embodiment, cognitive analyzation program 122 receives a user request, wherein the user request defines one or more digital media data, associated with the one or more digital media streams, to be analyzed for one or more complex objects. Cognitive analyzation program 122 identifies a one or more of complex objects associated with the one or more digital media data. Cognitive analyzation program 122 requests one or more cognitive entities to assist in analyzing the plurality of complex objects and fetching additional information related to the one or more of complex objects.

In one embodiment, cognitive analyzation program 122 analyzes the user request. Cognitive analyzation program 122 identifies (i) the one or more digital media streams and (ii) the predicted value estimation associated with each individual complex object is to be generated based on the identification of the one or more complex object.

In one embodiment, cognitive analyzation program 122 analyzes the one or more digital media streams associated with the user request. Cognitive analyzation program 122 identifies the one or more objects contained within the one or more digital media streams. Cognitive analyzation program 122 identifies one or more characteristics associated with the one or more objects. Cognitive analyzation program 122 determines that the one or more identified characteristics associated with the one or more objects is directed towards one or more complex objects defined in the user request. Cognitive analyzation program 122 communicates the one or more complex objects to the distributed cognitive system.

In one embodiment, the distributed cognitive system includes a plurality of cognitive entities, wherein each cognitive entity represents a specific cognitive function that collects one or more dynamic information associated with the one or more complex objects. Cognitive analyzation program 122 analyzes the one or more complex objects utilizing the distributed cognitive system. Cognitive analyzation program 122 executes a parameter search to obtain additional information relative to the nature of the one or more complex objects. Cognitive analyzation program 122 identifies one or more parameters associated with the nature of the one or more complex objects, wherein the one or more parameters include one of or a combination of: (i) type, (ii) architecture, (iii) cost, (iv) location, (v) resolution of the object, (vi) one or more amenities, or (vii) embellishments.

In one embodiment, cognitive analyzation program 122 executes a machine learning analysis associated with (i) the one or more parameters and (ii) the one or more dynamic information, wherein the machine learning analysis weights the one or more parameters with the one or more dynamic information and positions the one or more parameters and the associated weights in one or more neurons of a feedforward topology and feeds the neurons through a first layer.

In one embodiment, cognitive analyzation program 122 receives one or more output data associated with the feedforward topology. Cognitive analyzation program 122 analyzes the one or more output data. Cognitive analyzation program 122 generates the predicted value estimation associated with the one or more complex objects contained within the digital media streams.

The present invention will now be described in detail with reference to the Figures.

FIG. 1 is a functional block diagram illustrating computing environment, generally designated 100, in accordance with one embodiment of the present invention. Computing environment 100 includes computer system 120 and storage area network 130 connected over network 110. Computer system 120 includes cognitive analyzation program 122, computer interface 124, and cognitive system 126. Storage area network 130 includes database 132.

In various embodiments of the present invention, computer system 120 is a computing device that can be a standalone device, a server, a laptop computer, a tablet computer, a netbook computer, a personal computer (PC), a personal digital assistant, a desktop computer, or any programmable electronic device capable of receiving, sending and processing data. In general, computer system 120 represents any programmable electronic device or combination of programmable electronic devices capable of executing machine readable program instructions and communications with various other computer systems (not shown). In another embodiment, computer system 120 represents a computing system utilizing clustered computers and components to act as a single pool of seamless resources. In general, computer system 120 can be any computing device or a combination of devices with access to various other computing systems (not shown) and is capable of executing cognitive analyzation program 122, computer interface 124, and cognitive system 126. Computer system 120 may include internal and external hardware components, as depicted and described in further detail with respect to FIG. 1.

In this exemplary embodiment, cognitive analyzation program 122, computer interface 124, and cognitive system 126 are stored on computer system 120. However, in other embodiments, cognitive analyzation program 122, computer interface 124, and cognitive system 126 are stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between computer system 120, storage area network 130, and various other computer systems (not shown), in accordance with a desired embodiment of the present invention.

In various embodiments of the present invention, the various other computer systems (not shown) can be a standalone device, a server, a laptop computer, a tablet computer, a netbook computer, a personal computer (PC), a desktop computer, or any programmable electronic device capable of receiving, sending, and processing data, In another embodiment, the various other computer systems represent a computing system utilizing clustered computers and components to act as a single pool of seamless resources. In general, the various other computer systems can be any computing device or combination of devices with access to computer system 120 and network 110 and is capable of executing cognitive analyzation program 122, computer interface 124, and cognitive system 126. The various other computer systems may include internal and external hardware components, as depicted and described in further detail with respect to FIG. 1.

In the embodiment depicted in FIG. 1, cognitive analyzation program 122, at least in part, has access to cognitive system 126 and can communicate data stored on computer system 120 to storage area network 130, and various other computer systems (not shown). More specifically, computer interface 124 defines a user of computer system 120 that has access to data stored on database 132.

In the embodiment depicted in FIG. 1, cognitive analyzation program 122 utilizes, at least in part, the data stored on database 132 to manage access to cognitive system 126 in response to a digital media recognition request from client device 140 (i.e., from a user of client device 140, alternatively referred to herein as "requestor"). More specifically, cognitive analyzation program 122 defines one or more artifacts and weights that represent the types of I/O that constitute a predicted value estimation profile of the complex objects. For example, the weight may be a value analysis metric, and the artifacts may be supplementary objects associated with the one or more complex objects.

Cognitive analyzation program 122 and cognitive system 126 are depicted in FIG. 1 for illustrative simplicity, computer system 120, however, can include any number of logics and/or programs that are managed in accordance with cognitive analyzation program 122. In general, computer system 120 manages access to cognitive analyzation program 122, which represents a physical or virtual resource. In some embodiments, cognitive analyzation program 122 includes certain information and cognitive system represents code that, when executed, enables computer system 120 to take specific action with respect to another physical resource and/or virtual resource based, at least in part, on that certain information. In other words, in one such embodiment, cognitive system 120 manages, at least in part, the ability of computer system 120 to take various actions with respect to one or more physical resources and/or virtual resources. In some embodiments, cognitive analyzation program 122 controls physical and/or virtual resources. In some embodiments, cognitive analyzation program 122 can also embody any combination of the aforementioned elements. To illustrate various aspects of the present invention, examples of cognitive analyzation program 122 are presented in which cognitive analyzation program 122 includes one or more of, but is not limited to: a user profile transaction, a predicted value estimation profile, an artificial neural network (ANN) request, are presented, but embodiments of cognitive analyzation program 122 are not limited thereto. Embodiments of the present invention recognize that cognitive analyzation program 122 may include other forms of transactions that are known in the art.

Storage area network (SAN) 130 is a storage system that includes database 132. SAN 130 may include one or more, but is not limited to, computing devices, server, server-cluster, web servers, databases and storage devices. SAN 130 operates to communicate with computer system, client device 140, and various other computing devices or computing systems (not shown) over a network, such as network 110. For example, SAN 130 communicates with cognitive analyzation program 122 to transfer data between, but is not limited to, computer system 120, client device 140, and various other computing devices or computer systems (not shown) that are connected to network 110. SAN 130 can be any computing device or a combination of devices that are communicatively connected to a local IoT network, i.e., a network comprised of various computing devices including, but are not limited to, computer system 120 and client device 140 to provide functionality described herein. SAN 130 can include internal and external hardware components as described with respect to FIG. 6. The present invention recognizes that FIG. 1 may include any number of computing devices, servers, databases, and/or storage devices, and the present invention is not limited to only what is depicted in FIG. 1. As such, in some embodiments, some or all of the features and functions of SAN 130 are included as apart of computer system 120, client device 140, and/or various other computing devices or computer systems. Similarly, in some embodiments, some of the features and functions of computer system 120 are included as part of SAN 130 and/or another computing device or computer system.

Additionally, in some embodiments, SAN 130 represents a cloud computing platform. Cloud computing is a model or service delivery for enabling convenient, on demand network access to a shared pool of configurable computing resources (e.g., networks, network bandwidth, servers, processors, memory, storage, applications, virtual machines, and services) that can be rapidly provisioned and released with minimal management effort or interaction with a provider of a service. A cloud model may include characteristics such as on-demand self-service, broad network access, resource pooling, rapid elasticity, and measured service, can be represented by service models including a platform as a service (PaaS) model, an infrastructure as a service (IaaS) model, and a software as a service (SaaS) model, and can be implemented as various deployment models including as a private cloud, a community cloud, a public cloud, and a hybrid cloud.

In various embodiments, SAN 130 is depicted in FIG. 1 for illustrative simplicity. However, it is to be understood that, in various embodiments, SAN 130 can include any number of databases that are managed in accordance with the functionality of an application executing on SAN 130. In general, database 132 represents data and an application executing on SAN 130 represents code that provides an ability to take specific action with respect to another physical or virtual resource and manages the ability to use and modify the data. In an alternative embodiment, cognitive analyzation program 122 can also represent any combination of the aforementioned features, in which an application executing on SAN 130 has access to database 132. To illustrate various aspects of the present invention, examples of the application executing on SAN 130 are presented in which cognitive analyzation program 122 represents one or more of, but is not limited to, a local IoT network and digital media recognition monitoring system.

In this exemplary embodiment, database 132 are stored on SAN 130. However, in various embodiments, database 132 may be stored externally and accessed through a communication network, such as network 110, as discussed above.

In the embodiment depicted in FIG. 1, the application executing on SAN 130, at least in part, has access to cognitive analyzation program 122 and can communicate data stored on SAN 130 to computer system 120. Alternatively, cognitive analyzation program 122 has access to the application executing on SAN 130 and can communicate I/O stored on computer system 120. In some embodiments, computer system 120 and SAN 130 have access to various other computing devices (not shown), as well as client device 140, and can communicate data stored, respectively stored on computer system 120 and SAN 130 to the various other computing devices and client device 140. For example, cognitive analyzation program 122 defines digital media-machine learning system for computer system 120 that has access to data on SAN 130 and has access to data on other computer systems (e.g., various other computing devices).

In various embodiments of the present invention computer system 120 includes cognitive system 126 which represents an artificial neural network (ANN), wherein the ANN comprises I/O, as well as multiple hidden layers of neurons (i.e., RELU layer). Additionally, cognitive system 126 includes one or more cognitive entities (e.g., cognitive entity 126A, cognitive entity 126B, and cognitive entity 126C). The present invention recognizes that cognitive system 126 could include any number of cognitive entities, and the present invention is not limited to the embodiment depicted in FIG. 1. Cognitive analyzation program 122 analyzes the (i) output data of the multilayer neural network and (ii) the change in the weight output, at least in part. Cognitive analyzation program 122 generates a predicted value estimation profile for the complex object associated with the digital media. Further, cognitive analyzation program 122 determines which supplementary artifacts should be associated with the complex object, based, at least, on the identification of the complex object.

In various embodiments of the present invention, a user of client device 140 generates a digital media recognition request, utilizing, at least, client application 142. In various embodiments, the user of client device 140 defines one or more complex objects within the digital media stream. In various embodiments, the complex objects represent objects within the digital media stream that include, but are not limited to, the following characteristics: (i) large in size, (ii) intricate, (iii) buildings, (iv) structures that encapsulate other objects, etc. Client application 142, executing on client device 140, communicates the digital media recognition request to computer system 120. In various embodiments, a user of client device 140 uploads one or more digital media to be communicated to computer system 120 with the digital media recognition request. The present invention recognizes that digital media includes, but is not limited to, images, video, and various other pictorial graphics known in the art. Additionally, a digital media recognition request represents a request from a user of client device 140 to computer system 120, wherein computer system 120 analyzes the digital media and generates a precited value estimation based, at least in part, on machine learning. In some embodiments, a digital media recognition request includes instructions for cognitive analyzation program 122 to retrieve the digital media stored on database 132.

In various embodiments, the predicted value analysis is generated based, at least, on machine learning executed by cognitive analyzation program 122. In various embodiments, cognitive analyzation program 122 analyzes the digital media data and identifies one or more parameters and one or more dynamic information, as discussed below. Cognitive analyzation program 122 assigns weights to the (i) one or more parameters and (ii) one or more dynamic information and assigns the (i) one or more parameters and (ii) one or more dynamic information to neurons within the feedforward topology. The cognitive analyzation program 122 collects output data from the feedforward topology and generates predicted value analysis. The predicted value analysis includes, but is not limited to materials, resources, skills to manufacture, perceived valued, cost, etc. associated with one or more complex objects.

In various embodiments, cognitive analyzation program 122 executing on computer system 120 receives one or more digital media recognition requests from client device 140 and various other computing devices (not shown). Additionally, cognitive analyzation program 122 retrieves one or more digital media streams from database 132 that are associated with the one or more digital media recognition requests. In various embodiments, the present invention recognizes that one or more digital media resides on database 132 as a stream of data and can be accessed by cognitive analyzation program 122. In addition, the one or more digital media may not be communicated with the digital media recognitive request, and therefore cognitive analyzation program 122 communicates with SAN 130 and retrieves the one or more digital media stream associated with the one or more digital media recognition requests from database 132.

In various embodiments of the present invention, cognitive analyzation program 122 analyzes the digital media recognition request and identifies (i) one or more digital media streams associated with the request and (ii) that a precited value estimation of the one or more digital media streams should be executed. In various embodiments cognitive analyzation program 122 analyzes the digital media streams and identifies one or more defined complex objects. In some embodiments, cognitive analyzation program 122 analyzes the digital media streams and identifies one or more complex objects that were not defined in the digital media recognition request.

In various embodiments, cognitive analyzation program 122 executes a parameter search to obtain additional information associated with the one or more identified complex objects. In various embodiments, cognitive analyzation program 122 obtains various parameters associated with the one or more identified complex objects based, at least in part, on the parameter search. In various embodiments of the present invention, parameters include, but are not limited to, type, architecture, cost, location, nature of the object, additional amenities, embellishments, etc. In some embodiments, cognitive analyzation program 122 stores the information about the parameters on database 132.

In various embodiments, cognitive analyzation program 122 communicates the one or more digital media streams to cognitive system 126 based, at least in part, on the analyzation of (i) the one or more complex objects and (ii) the one or more parameters. In an alternative embodiments, cognitive system 126 requests the one or more digital media streams from cognitive analyzation program 122 by communicating a set of program instructions to cognitive analyzation program 122 instructing cognitive analyzation program 122 to communicate the one or more digital media streams based, at least in part, on the analyzation performed by cognitive analyzation program 122.

In various embodiments of the present invention, cognitive system 126 includes one or more cognitive entities (e.g., cognitive entity 126A, cognitive entity 126B, cognitive entity 126C, etc.) that represent cognitive entities that analyze and execute machine learning with respect to specific parameters associated with the digital media streams and one or more complex objects. In some embodiments, the one or more cognitive entities include, but are not limited to, audio-visual processing entity, location entity, ambience recognition entity, furniture identifier entity, etc. In various embodiments, the one or more cognitive entities collect dynamic information associated with the various parameters. The dynamic information includes, but is not limited to, interior design information (e.g., wall patterns, molding, floors, etc.), room amenities (e.g., kitchen, bathroom, etc.), whether a backyard is present location, construction company contact information, etc. Based, at least in part, on the identification of the various parameters associated with the one or more complex objects, cognitive system 126 distributes the digital media to various cognitive entities for further analyzation. In various embodiments, cognitive system 126 based, at least, in part, on the analyzation of the digital media streams assigns weights to the (i) one or more parameters and (ii) one or more dynamic information. In some embodiments, cognitive system 126 executes machine learning and generates a precited value estimation based, at least, on the identified complex object. In various embodiments, cognitive system 126 generates a predicted value estimation to determine, at least, one of the following, but embodiments of the present invention are not limited hereto: (i) the cost of constructing a multi-story building, (ii) the cost of decorating and updating the interior of a building, and (iii) the cost of renovating or restoring one or more complex objects (e.g., statutes, buildings, etc.), etc.

In one embodiment and example, cognitive analyzation program 122 analyzed a digital media recognition request and the accompanying digital media streams and identified a multi-story building. In some embodiments, cognitive system 126 receives this information from cognitive analyzation program 122 and communicates the various identified parameters to one or more cognitive entities for further analyzation and machine learning. In various embodiments, the one or more cognitive entities collect dynamic information associated with the various parameters. The dynamic information includes, but is not limited to, interior design information (e.g., wall patterns, molding, floors, etc.), room amenities (e.g., kitchen, bathroom, etc.), whether a backyard is present location, construction company contact information, etc. In some embodiments, the one or more cognitive represent entities that analyze the (i) location of the multi-story building, (ii) furniture identifier, and (iii) floor concept entity, etc. Based, at least in part, on the identification of various dynamic information, cognitive system 126 distributes the digital media streams to one or more cognitive entities to execute machine learning and determine the precited value estimation for the multi-story building.

In various embodiments, cognitive system 126 based, at least, in part, on the analyzation of the digital media streams assigns weights to the (i) one or more parameters and (ii) one or more dynamic information. In some embodiments, cognitive system 126 determines the weight assigned to each parameter and/or dynamic information based, at least in part, on the digital media recognition request. The one or more cognitive entities arrange the I/O data into neurons in the first layer of the artificial neural network based, at least in part, on the identification of (i) the one or more parameters and (ii) one or more dynamic information. The I/O is then transformed through the activation function in the neural network, wherein, the weights and thresholds are connected from, at least, the first layer to a second layer. Embodiments of the present invention are not limited to the first and second layer, additionally, embodiments of the present invention may contain a plurality of layers within the artificial neural network. The ANN learns, within the neural network, by altering the weights after each piece of data is processed, based on the amount of error in the output compared with the expected result. Further, the ANN generates a predicted value estimation associated with each parameter and/or dynamic information, respectively, which is based, at least, on the (i) weight assigned to each parameter and dynamic information. In various embodiments, cognitive system 126 communicates the generated predicted value estimation to cognitive analyzation program 122 for further analyzation.

In some embodiments, cognitive analyzation program 122 receives the generated predicted value estimation from cognitive system 126 and analyzes the generated predicted value estimation. Cognitive analyzation program 122 identifies one or more values associated with various parameters and/or dynamic information associated with one or more complex objects. In various embodiments, cognitive analyzation program 122 identifies based, at least in part, on a multi-story building (i.e., complex object), the total cost to complete the molding, flooring, and drywalling of walls inside the building. In some embodiments, cognitive analyzation program 122 identifies the cost of the preservation and restoration of one or more statutes that are exposed to inclement weather. Cognitive analyzation program 122 compiles the predicted value estimation and communicates the predicted value estimation to client device 140 to be populated to the user of client device 140. The present invention recognizes that cognitive system 126 is capable of executing machine learning and generating a predicted value estimation for a variety of parameter and dynamic information associated with complex objects. Additionally, the present invention is not limited to the embodiments provided herein and is further capable of identifying various parameters and dynamic information associated with one or more complex objects.

Figure 2:
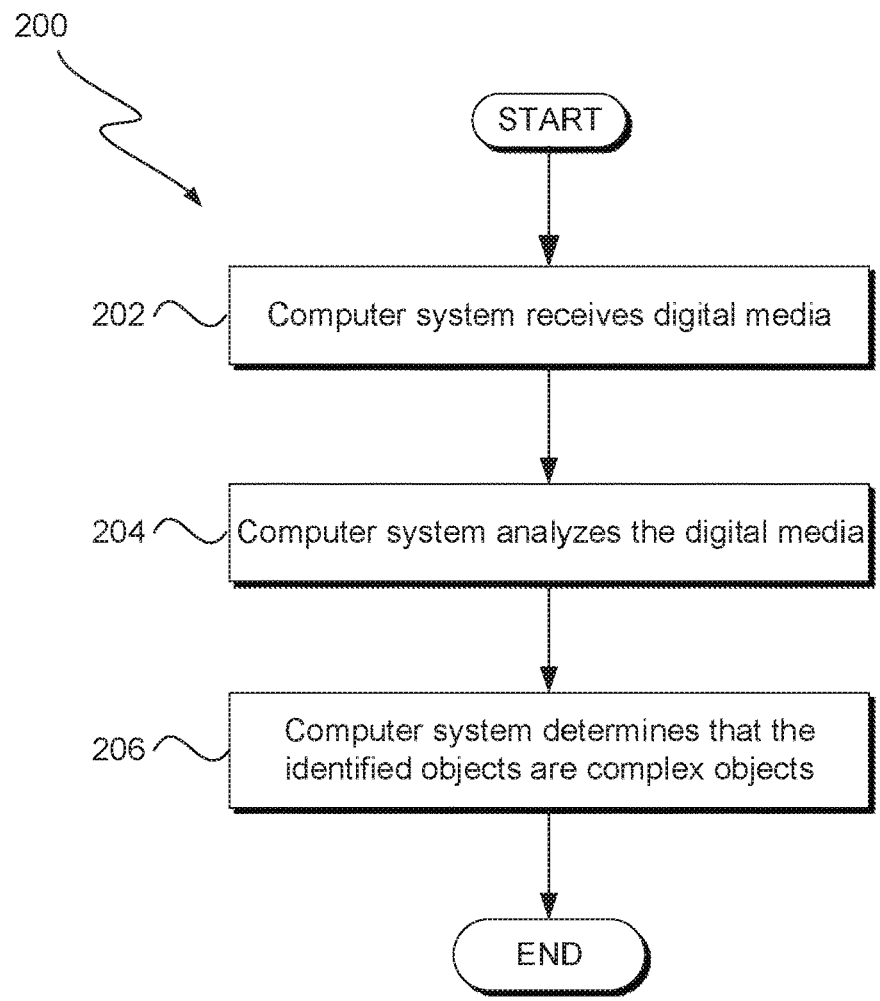
FIG. 2 illustrates operational processes of executing a system for image and video processing, on a computing device within the environment of FIG. 1, in accordance with an exemplary embodiment of the present invention.

FIG. 2 is a flowchart, 200, depicting operations of cognitive analyzation program 122 in computing environment 100, in accordance with an illustrative embodiment of the present invention. FIG. 2 also represents certain interactions between cognitive analyzation program 122 and cognitive system 126. In some embodiments, the operations depicted in FIG. 2 incorporate the output of certain logical operations of client application 142 executing on client device 140. It should be appreciated that FIG. 2 provides an illustration of one implementation and does not imply any limitations with regard to the environments in which different embodiments may be implemented. Many modifications to the depicted environment may be made. In one embodiment, the series of operations depicted in FIG. 2 can be performed in any order. In some embodiments, the series of operations, depicted in FIG. 2, can be performed simultaneously. Additionally, the series of operations, depicted in FIG. 2, can be terminated at any operation. In addition to the features previously mentioned, any operations, depicted in FIG. 2, can be resumed at any time.

In operations 202, cognitive analyzation program 122 receives a digital media recognition request from client device 140. In various embodiments of the present invention, cognitive analyzation program 122 receives one or more digital media recognition requests from client device 140. In some embodiments, cognitive analyzation program 122 receives one or more digital media streams associated with the one or more digital media recognition requests. In some embodiments, cognitive analyzation program 122 receives one or more digital media recognition requests with program instructions that cognitive analyzation program 122 can retrieve one or more digital media streams, associated with the one or more digital media recognition requests, from database 132. In various embodiments, cognitive analyzation program 122 retrieves one or more digital media streams from database 132.

In operation 204, cognitive analyzation program 122 analyzes the digital media recognition request and determines that (i) one or more objects are present in the one or more digital media streams and (ii) a predicted value estimation, associated with each individual complex object is to be generated. In various embodiments, cognitive analyzation program 122 analyzes the one or more digital media streams and identifies one or more objects contained within the one or more digital media streams.

In various embodiments, cognitive analyzation program 122 identifies various objects contained within the digital media stream and cognitive analyzation program 122 communicates the identified objects to a user of client device 140 for verification. In some embodiments, cognitive analyzation program 122 communicates the identified objects to client application 142 with program instructions, instructing client application 142 to communicate the identified objects to a user of client device 140. Additionally, cognitive analyzation program 122 communicates the identified objects to the user of client device 140 to verify that a predicted value estimation should be performed in connection with the identified objects. In some embodiments, a user of client device 140 verifies that the identified objects are complex objects and a predicted value estimation should be performed, as discussed above.

In alternative embodiments, a user of client device 140 denies that the identified objects are complex objects and a predicted value estimation should not be performed. In the embodiments where a user of client device 140 denies the verification, the user of client device 140 draws an outline surrounding one or more complex objects within the digital media stream and communicates the outlined digital media stream to cognitive analyzation program 122.

In various embodiments, cognitive analyzation program 122 analyzes the outlined digital media stream and identifies one or more complex objects outlined by the user of client device 140. Cognitive analyzation program 122 stores the one or more complex objects on database 132.

In operation 206, cognitive analyzation program 122 identifies various objects contained within the one or more digital media streams. In various embodiments, cognitive analyzation program 122 detects that the one or more objects contained within the digital media streams are complex objects based, at least in part, on one or a combination of various characteristics associated with the one or more complex objects. Cognitive analyzation program 122 stores the one or more identified complex objects on database 132.

In some embodiments, cognitive analyzation program 122 identifies one or more complex objects contained within the one or more digital media streams. In various embodiments, cognitive analyzation program 122 analyzes the one or more digital media streams and identifies the one or more complex objects based, at least in part, on the identification of various characteristics associated with the one or more complex objects, as discussed above. In various embodiments, cognitive analyzation program 122 identifies a complex object based, at least in part, on one or a combination of the following characteristics: size, shape, amenities, design, façade, intricacies, buildings, structures that encapsulate other objects, windows, type of architecture, etc. The present invention recognizes that one having ordinary skill in the art would understand that cognitive analyzation program 122 includes, at least, computer vision and/or image processing to detect and identify various object and/or complex objects.

In various embodiments, cognitive analyzation program 122 determines based, at least in part, on the identification of the one or more complex objects, that the one or more complex objects should be communicated to cognitive system 126. In various embodiments of the present invention, cognitive analyzation program 122 communicates the (i) one or more digital media streams and (ii) the identified one or more complex objects with program instructions to cognitive system 126. In various embodiments, cognitive system 126 distributes the digital media stream and the identified complex objects among the various cognitive entities (e.g., cognitive entity 126A, cognitive entity 126B, and cognitive entity 126C) for further analyzation. In some embodiments of the present invention, based, at least in part, on the analyzation of the complex object, one or more cognitive entities determine that the complex object contains various parameters and dynamic information.

Figure 3:
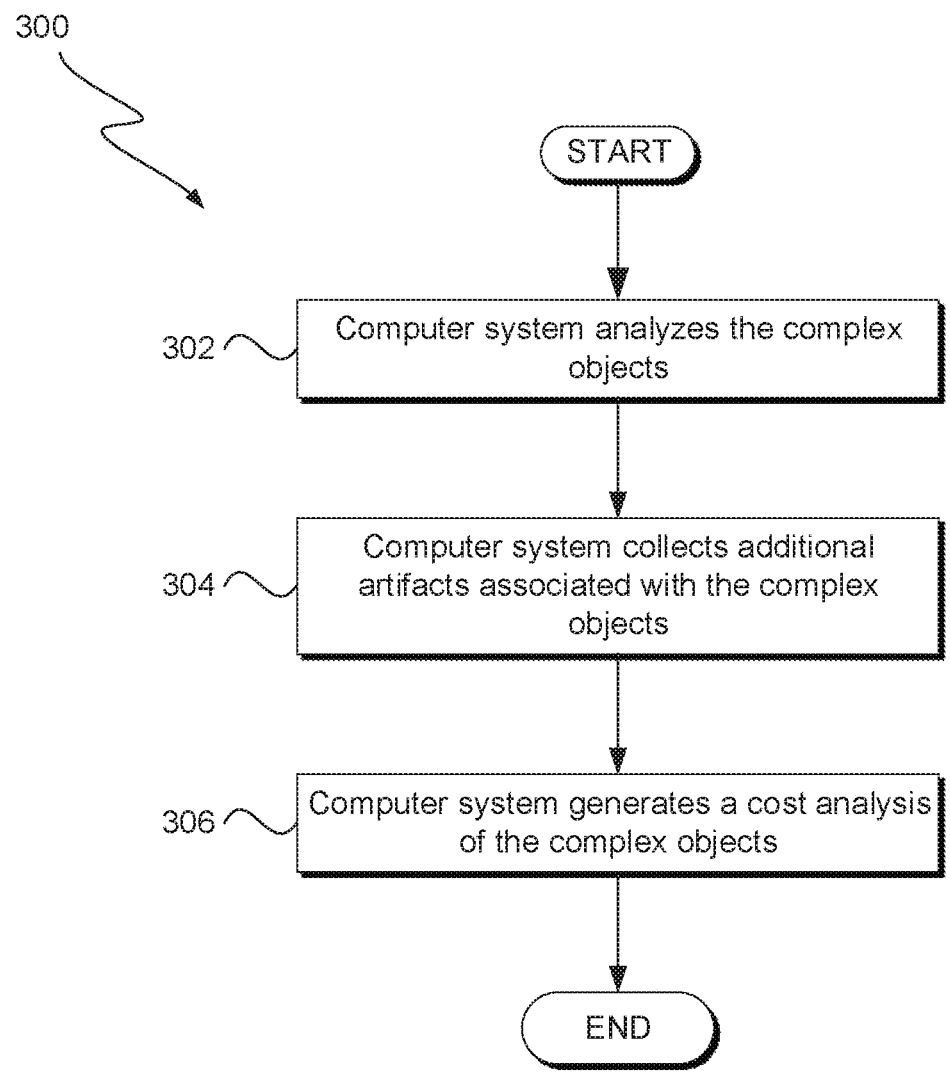
FIG. 3 illustrates operational processes of executing a system for neural networks in value estimation, on a computing device within the environment of FIG. 1, in accordance with an exemplary embodiment of the present invention.

FIG. 3 depicts flowchart, 300, depicting operations of cognitive system 126 in computing environment 100, in accordance with an illustrative embodiment of the present invention. More specifically, FIG. 3, depicts combined overall operations, 300, of cognitive system 126 9executing on computer system 120). In some embodiments, operations 300 represents logical operations of cognitive system 126, wherein interactions between cognitive system 126 and cognitive analyzation program 122 represents logical units executing on computer system 120. Further, operations 300 can include a portion or all of combined overall operations of 200. In various embodiments, the series of operations 300, can be performed at the conclusion of operations 200. In some embodiments, operations 300, can be performed simultaneously with operations 200. It should be appreciated that FIG. 3 provides an illustration of one implementation and does not imply any limitations with regard to the environments in which different embodiments may be implemented. Many modifications to the depicted environment may be made. In one embodiment, the series of operations, of flowchart 300, can be performed simultaneously. Additionally, the series of operations, in flowchart 300, can be terminated at any operation. In addition to the features previously mentioned, any operations of flowchart 300, can be resumed at any time.

In operation 302, In various embodiments, cognitive system 126 distributes the one or more digital media streams and the identified complex objects among the various cognitive entities (e.g., cognitive entity 126A, cognitive entity 126B, and cognitive entity 126C) for further analyzation. In some embodiments of the present invention, based, at least in part, on the analyzation of the complex object, one or more cognitive entities determine that the complex object contains various parameters and dynamic information. In various embodiments, cognitive analyzation program 122 executes a parameter search to obtain additional information associated with the one or more identified complex objects. In various embodiments, cognitive analyzation program 122 obtains various parameters associated with the one or more identified complex objects based, at least in part, on the parameter search. In various embodiments of the present invention, parameters include, but are not limited to, type, architecture, cost, location, resolution of the object, additional amenities, embellishments, etc. In some embodiments, cognitive analyzation program 122 stores the information about the parameters on database 132. In various embodiments of the present invention, cognitive analyzation program 122 communicates the digital media streams and the one or more parameters to cognitive system 126.

In operation 304, cognitive system 126 includes one or more cognitive entities (e.g., cognitive entity 126A, cognitive entity 126B, cognitive entity 126C, etc.) that represent cognitive entities that analyze and execute machine learning with respect to specific parameters associated with the digital media streams and one or more complex objects. In some embodiments, the one or more cognitive entities include, but are not limited to, audio-visual processing entity, location entity, ambience recognition entity, furniture identifier entity, etc. In various embodiments, the one or more cognitive entities collect dynamic information associated with the various parameters, as discussed above. Based, at least in part, on the identification of the various parameters and dynamic information associated with the one or more complex objects, cognitive system 126 distributes the digital media to various cognitive entities for further analyzation.

In various embodiments, cognitive system 126 based, at least, in part, on the analyzation of the digital media streams assigns weights to the (i) one or more parameters and (ii) one or more dynamic information. In some embodiments, cognitive system 126 executes machine learning and generates a predicted value estimation based, at least, on the identified complex object. Cognitive system 126 receives data and program instructions from the various cognitive entities that performed machine learning against the input data, wherein the data indicates the related values associated with the one or more parameters and the one or more dynamic information. In one embodiment and example, cognitive entity 126A is designated as a location identifier and determines that the multi-story building is located in location A. Additionally, cognitive entity 126B is designated as interior design and based, at least in part, on the location of the multi-story building determines the average price to complete the molding throughout the entirety of the multi-story building. In various embodiments, the various cognitive entities generate an associated value based, at least in part, on the weight assigned to each parameter and/or dynamic information that is feed through one or more layers in the artificial neural network, that includes a feedforward topology. The present invention recognizes that there are a variety of parameters and dynamic information to be collected and analyzed by the cognitive entities, and the present invention is not limited to what is presented in an example.

In operation 306, cognitive system 126 generates a predicted value estimation associated with one or more complex objects. In various embodiments, cognitive system 126 generates a predicted value estimation associated with each parameter and/or dynamic information, respectively, which is based, at least, on the (i) weight assigned to each parameter and dynamic information. In various embodiments, cognitive system 126 communicates the generated predicted value estimation to cognitive analyzation program 122 for further analyzation.

In various embodiments, cognitive analyzation program 122 identifies one or more reports of value associated with various parameters and/or dynamic information associated with one or more complex objects. In various embodiments, cognitive analyzation program 122 identifies based, at least in part, on a multi-story building (i.e., complex object), the total cost to complete the molding, flooring, and drywalling of walls inside the building. In some embodiments, cognitive analyzation program 122 identifies the cost of the preservation and restoration of one or more statutes that are exposed to inclement weather. Cognitive analyzation program 122 compiles the predicted value estimation and communicates the predicted value estimation to client device 140 to be populated to the user of client device 140. The present invention recognizes that cognitive system 126 is capable of executing machine learning and generating a predicted value estimation for a variety of parameter and dynamic information associated with complex objects. In various embodiments, cognitive analyzation program 122 communicates the predicted value estimation to client device 140 with program instructions to populate the predicted value estimation on client device 140.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
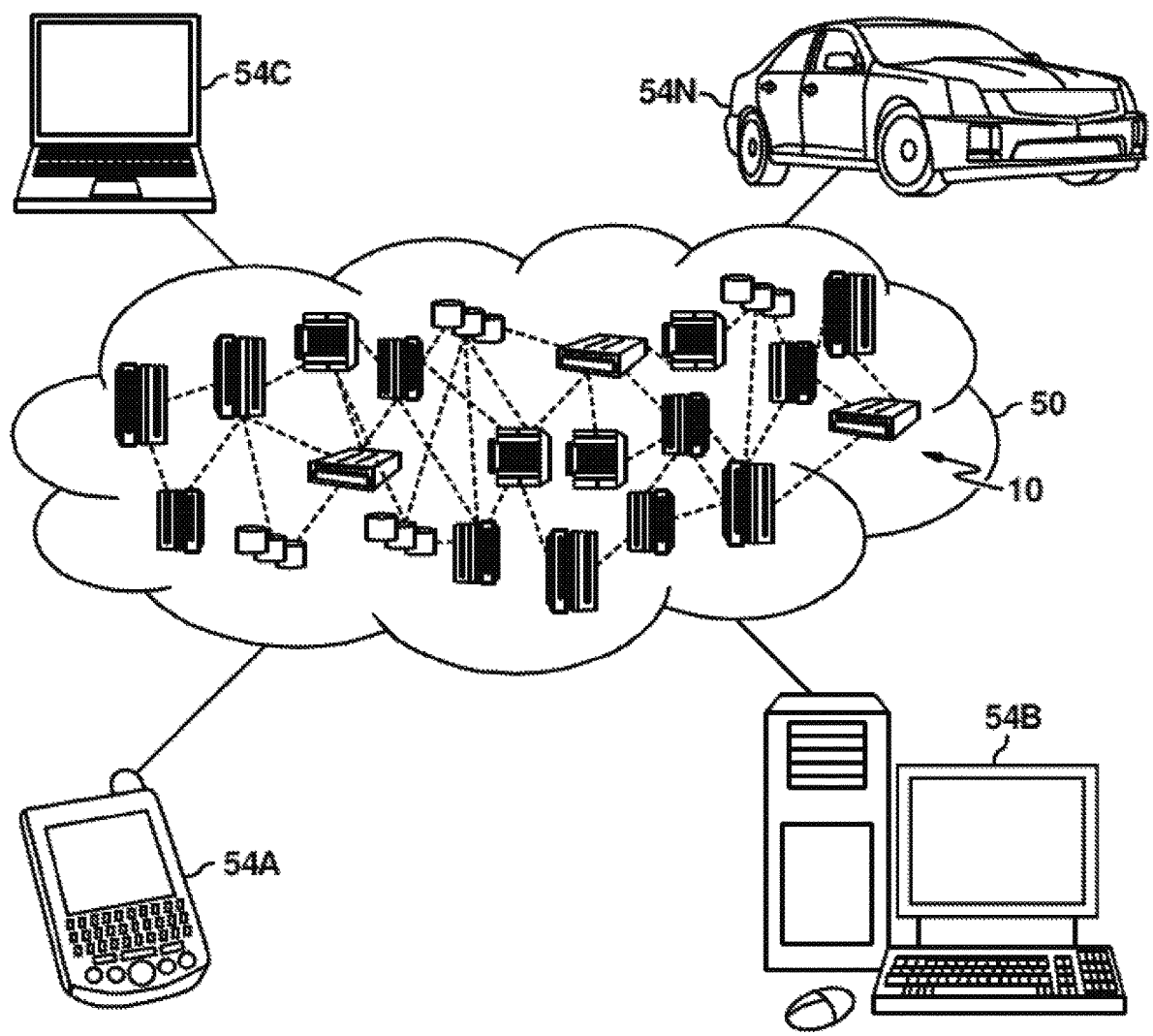
FIG. 4 depicts a cloud computing environment according to at least one embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
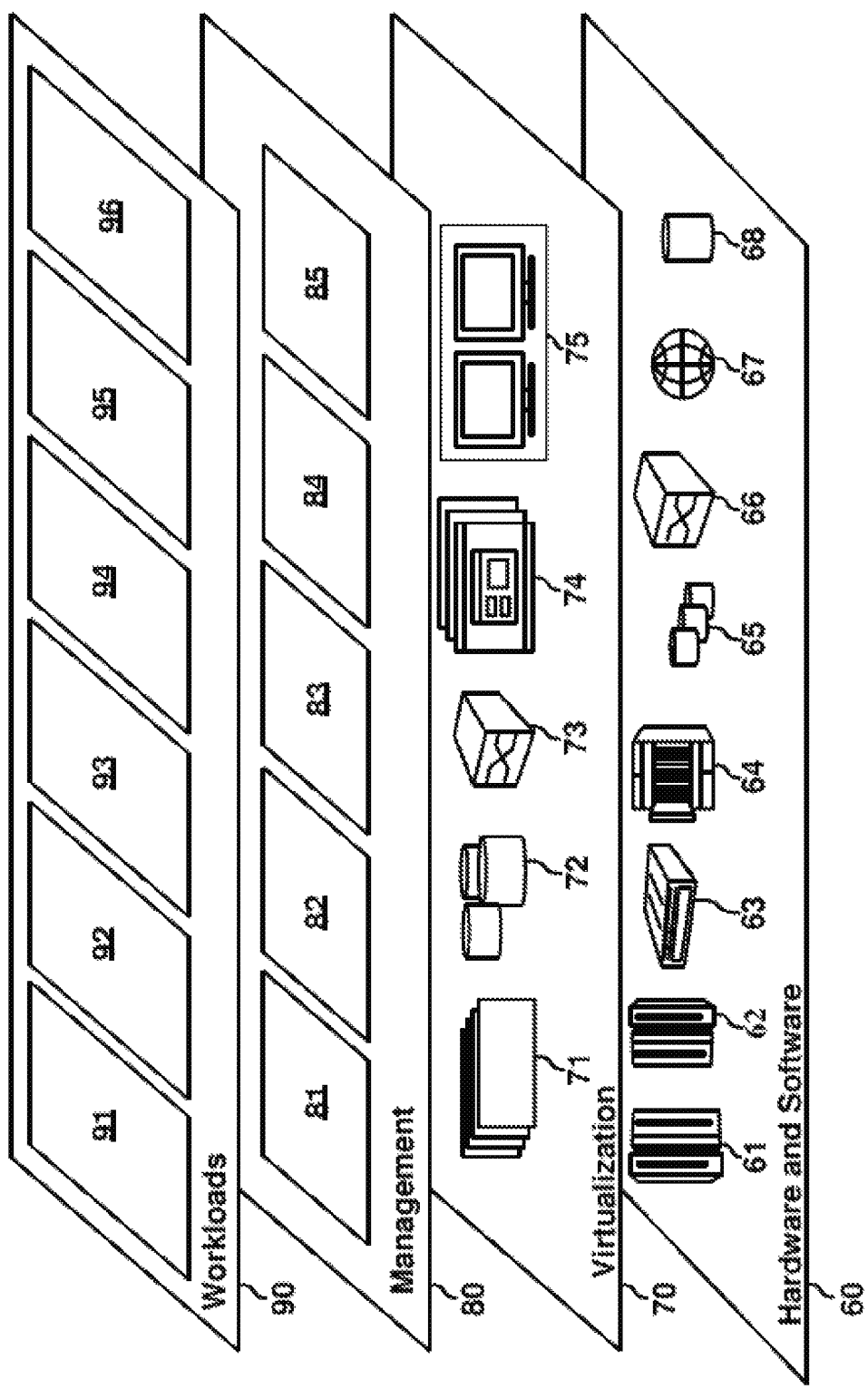
FIG. 5 depicts abstraction model layers according to at least on embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

Figure 6:
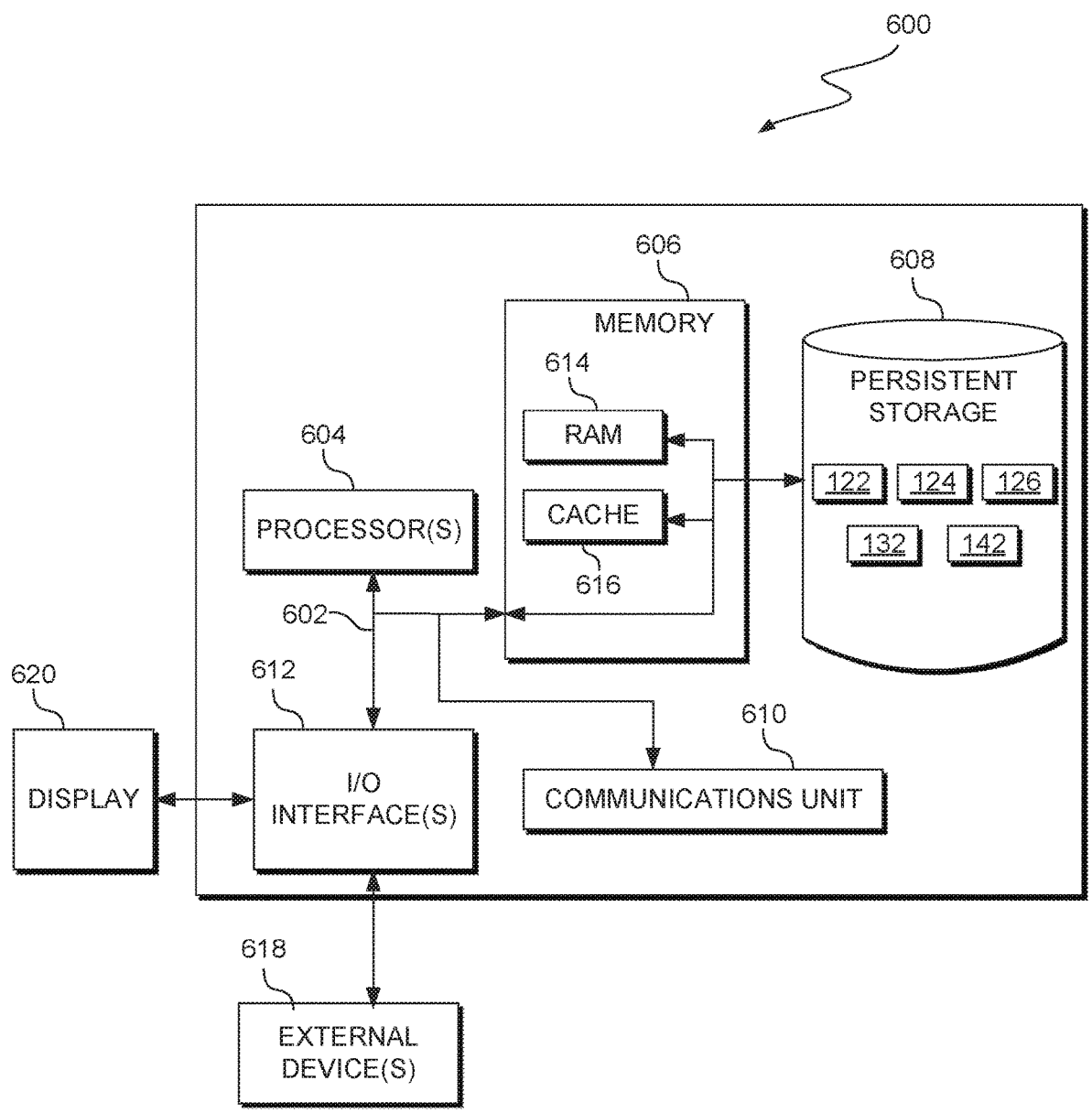
FIG. 6 is a block diagram of components of one or more computing devices within the computing environment depicted of FIG. 1, in accordance with an embodiment of the present invention.

FIG. 6 depicts a block diagram, 600, of components of computer system 120, SAN 130, and client device 140, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computer system 120, SAN 130, and client device 140 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Cognitive analyzation program 122, computer interface 124, cognitive system 126 (cognitive entity 126A, cognitive entity 126B, cognitive entity 126C, etc.), database 132, and client application 142 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 110. In these examples, communications unit 610 includes one or more network interface cards. Communications unit 610 may provide communications through the use of either or both physical and wireless communications links. Cognitive analyzation program 122, computer interface 124, cognitive system 126 (cognitive entity 126A, cognitive entity 126B, cognitive entity 126C, etc.), database 132, and client application 142 may be downloaded to persistent storage 608 through communications unit 610.

I/O interface(s) 612 allows for input and output of data with other devices that may be connected to computer system 120, SAN 130, and client device 140. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., cognitive analyzation program 122, computer interface 124, cognitive system 126 (cognitive entity 126A, cognitive entity 126B, cognitive entity 126C, etc.), database 132, and client application 142, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A method of capturing event information, the method comprising:
   receiving, by one or more processors, a user request, wherein the user request defines one or more digital media data, associated with one or more digital media streams, to be analyzed for one or more complex objects associated with the one or more digital media data;
   analyzing, by the one or more processors, the one or more digital media streams for one or more objects;
   identifying, by the one or more processors, the one or more objects contained within the one or more digital media streams and one or more characteristics associated with the one or more objects;
   determining, by the one or more processors, that the one or more identified characteristics associated with the one or more identified objects are directed towards the one or more complex objects defined in the user request;
   generating, by one or more processors, a predicted value estimation of the one or more objects via invocation of additional multi-level input collection in a distributed cognitive system; and
   communicating, by one or more processors, a report associated with the predicted value estimation of the object and the one or more complex objects.

2. The method of claim 1, the method further comprising:
   analyzing, by the one or more processors, the user request; and
   identifying, by the one or more processors, (i) the one or more digital media streams and (ii) the predicted value estimation associated with each individual complex object is to be generated based on the identification of the one or more complex objects.

3. The method of claim 1, the method further comprising:
   a distributed cognitive system that includes a plurality of cognitive entities, wherein each cognitive entity represents a specific cognitive function that collects one or more dynamic information associated with the one or more complex objects;
   analyzing, by the one or more processors, the one or more complex objects utilizing the distributed cognitive system;
   executing, by the one or more processors, a parameter search to obtain additional information relative to the nature of the one or more complex objects; and
   identifying, by the one or more processors, one or more parameters associated with the nature of the one or more complex objects, wherein the one or more parameters include one of or a combination of: (i) type, (ii) architecture, (iii) cost, (iv) location, (v) resolution of the object, (vi) one or more amenities, or (vii) embellishments.

4. The method of claim 3, the method further comprising:
executing, by the one or more processors, a machine learning analysis associated with (i) the one or more parameters and (ii) the one or more dynamic information, wherein the machine learning analysis weights the one or more parameters with the one or more dynamic information and positions the one or more parameters and the associated weights in one or more neurons of a feedforward topology and feeds the neurons through a first layer.

5. The method of claim 4, the method further comprising:
receiving, by the one or more processors, one or more output data associated with the feedforward topology;
analyzing, by the one or more processors, the one or more output data; and
generating, by the one or more processors, the predicted value estimation associated with the one or more complex objects contained within the digital media streams.

6. A computer program product comprising:
one or more computer-readable storage media and program instructions stored on the one or more computer-readable storage media, the program instructions comprising:
program instructions to receive a user request, wherein the user request defines one or more digital media data, associated with one or more digital media streams, to be analyzed for one or more complex objects associated with the one or more digital media data;
program instructions to analyze the one or more digital media streams for one or more objects;
program instructions to identify the one or more objects contained within the one or more digital media streams and one or more characteristics associated with the one or more objects;
program instructions to determine that the one or more identified characteristics associated with the one or more identified objects are directed towards the one or more complex objects defined in the user request;
program instructions to generate a predicted value estimation of the one or more objects via invocation of additional multi-level input collection in a distributed cognitive system; and
program instructions to communicate a report associated with the predicted value estimation of the object and the one or more complex objects.

7. The computer program product of claim 6, the program instructions further comprising:
program instructions to analyze the user request; and
program instructions to identify (i) the one or more digital media streams and (ii) the predicted value estimation associated with each individual complex object to be generated based on the identification of the complex object.

8. The computer program product of claim 6, the program instructions further comprising:
program instructions for a distributed cognitive system that includes a plurality of cognitive entities, wherein each cognitive entity represents a specific cognitive function that collects one or more dynamic information associated with the one or more complex objects;
program instructions to analyze the one or more complex objects utilizing the distributed cognitive system;
program instructions to execute a parameter search to obtained additional information relative to the nature of the one or more complex objects; and program instructions to identify one or more parameters associated with the nature of the one or more complex objects, wherein the one or more parameters include one of or a combination of: (i) type, (ii) architecture, (iii) cost, (iv) location, (v) resolution of the object, (vi) one or more amenities, or (vii) embellishments.

9. The computer program product of claim 8, the program instructions further comprising:
program instructions to execute a machine learning analysis associated with (i) the one or more parameters and (ii) the one or more dynamic information, wherein the machine learning analysis weights the one or more parameters with the one or more dynamic information and positions the one or more parameters and the associated weights in one or more neurons of a feedforward topology and feeds the neurons through a first layer.

10. The computer program product of claim 9, the program instructions further comprising:
program instructions to receive one or more output data associated with feedforward topology;
program instructions to analyze the one or more output data; and
program instructions to generate the predicted value estimation associated with the one or more complex objects contained within the digital media streams.

11. A computer system, the computer system comprising:
one or more computer processors;
one or more computer readable storage medium; and
program instructions stored on the computer readable storage medium for execution by at least one of the one or more processors, the program instructions comprising:
program instructions to receive a user request, wherein the user request defines one or more digital media data, associated with one or more digital media streams, to be analyzed for one or more complex objects associated with the one or more digital media data;
program instructions to analyze the one or more digital media streams for one or more objects;
program instructions to identify the one or more objects contained within the one or more digital media streams and one or more characteristics associated with the one or more objects;
program instructions to determine that the one or more identified characteristics associated with the one or more identified objects are directed towards the one or more complex objects defined in the user request;
program instructions to generate a predicted value estimation of the one or more objects via invocation of additional multi-level input collection in a distributed cognitive system; and
program instructions to communicate a report associated with the predicted value estimation of the object and the one or more complex objects.

12. The computer system of claim 11, the program instructions further comprising:
program instructions for a distributed cognitive system that includes a plurality of cognitive entities, wherein each cognitive entity represents a specific cognitive function that collects one or more dynamic information associated with the one or more complex objects;
program instructions to analyze the one or more complex objects utilizing the distributed cognitive system;

program instructions to execute a parameter search to obtained additional information relative to the nature of the one or more complex objects; and program instructions to identify one or more parameters associated with the nature of the one or more complex objects, wherein the one or more parameters include one of or a combination of: (i) type, (ii) architecture, (iii) cost, (iv) location, (v) resolution of the object, (vi) one or more amenities, or (vii) embellishments.

13. The computer system of claim 12, the program instructions further comprising:

program instructions to execute a machine learning analysis associated with (i) the one or more parameters and (ii) the one or more dynamic information, wherein the machine learning analysis weights the one or more parameters with the one or more dynamic information and positions the one or more parameters and the associated weights in one or more neurons of a feedforward topology and feeds the neurons through a first layer.

14. The computer system of claim 13, the program instructions further comprising:

program instructions to receive one or more output data associated with feedforward topology;

program instructions to analyze the one or more output data; and program instructions to generate the predicted value estimation associated with the one or more complex objects contained within the digital media streams.

* * * * *